US012759925B2

(12) United States Patent
Frebourg et al.

(10) Patent No.: US 12,759,925 B2
(45) Date of Patent: Oct. 13, 2026

(54) TOOL FOR SHAPING A HOT SUBSTRATE

(71) Applicant: SAINT-GOBAIN GLASS FRANCE, Courbevoie (FR)

(72) Inventors: Philippe Frebourg, Senlis (FR); Gaëtan Sciacchitano, Ermont (FR); David Valcke, Boulogne la Grasse (FR); Jérôme Gobin, Saint Leger aux Bois (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 264 days.

(21) Appl. No.: 18/566,438

(22) PCT Filed: Jun. 13, 2022

(86) PCT No.: PCT/FR2022/051125

§ 371 (c)(1),
(2) Date: Dec. 1, 2023

(87) PCT Pub. No.: WO2022/263759

PCT Pub. Date: Dec. 22, 2022

(65) Prior Publication Data

US 2024/0254031 A1 Aug. 1, 2024

(30) Foreign Application Priority Data

Jun. 14, 2021 (FR) ...................................... 2106247

(51) Int. Cl.

| | |
|---|---|
| ***C03B 23/023*** | (2006.01) |
| ***C03B 23/03*** | (2006.01) |
| ***C03B 40/00*** | (2006.01) |

(52) U.S. Cl.
CPC ...... *C03B 23/0235* (2013.01); *C03B 23/0307* (2013.01); *C03B 40/005* (2013.01)

(58) Field of Classification Search
CPC .............. C03B 40/005; B29C 33/3828; B29C 33/3807
See application file for complete search history.

(56) References Cited

U.S. PATENT DOCUMENTS

| | | | |
|---|---|---|---|
| 2011/0205485 A1 | 8/2011 | Sonzogni | |
| 2015/0202800 A1 | 7/2015 | Luquain | |
| 2022/0234256 A1* | 7/2022 | Siltamäki ............ | B29D 35/122 |

FOREIGN PATENT DOCUMENTS

| | | |
|---|---|---|
| DE | 103 35 453 A1 | 2/2005 |
| EP | 0 838 438 A1 | 4/1998 |

OTHER PUBLICATIONS

First Office Action as issued in Chinese Patent Application No. 202280004693.4, dated Dec. 26, 2024.

(Continued)

*Primary Examiner* — Erin Snelting
(74) *Attorney, Agent, or Firm* — CUSHMAN PARTNERS LLC

(57) ABSTRACT

A shaping tool includes a membrane made of a polymer material, the membrane having a shaping surface, and a thermalization system inserted into the membrane. Moreover, a method for constructing a membrane of a shaping tool includes providing a mold with a shape of the membrane to be made and a polymer material that constitutes the membrane; pouring the material into the mold; cross-linking the material; providing a thermalization device and providing a device for increasing thermal conductivity.

23 Claims, 5 Drawing Sheets

(56) References Cited

OTHER PUBLICATIONS

International Search Report as issued in International Patent Application No. PCT/FR2022/051125, dated Aug. 16, 2022.

* cited by examiner

[Fig. 1]
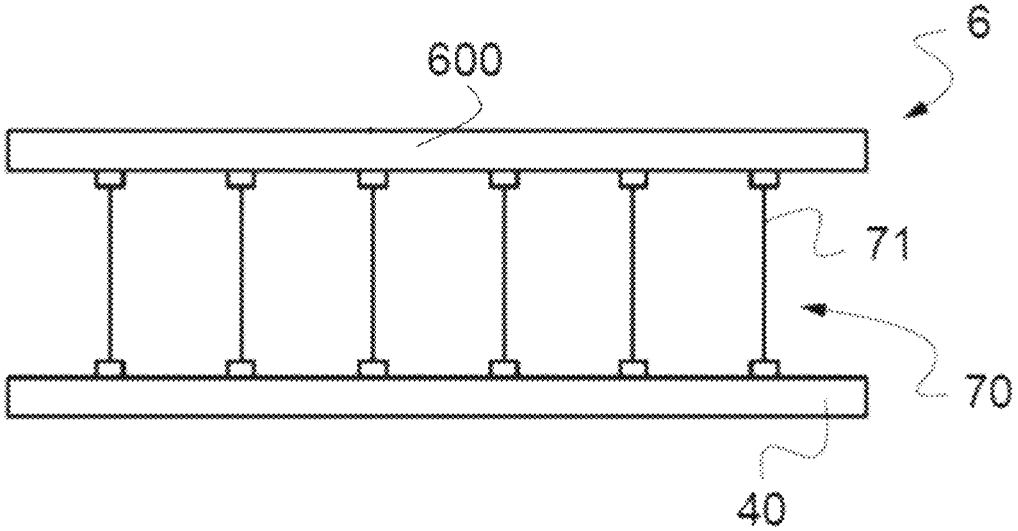
[Fig. 2]
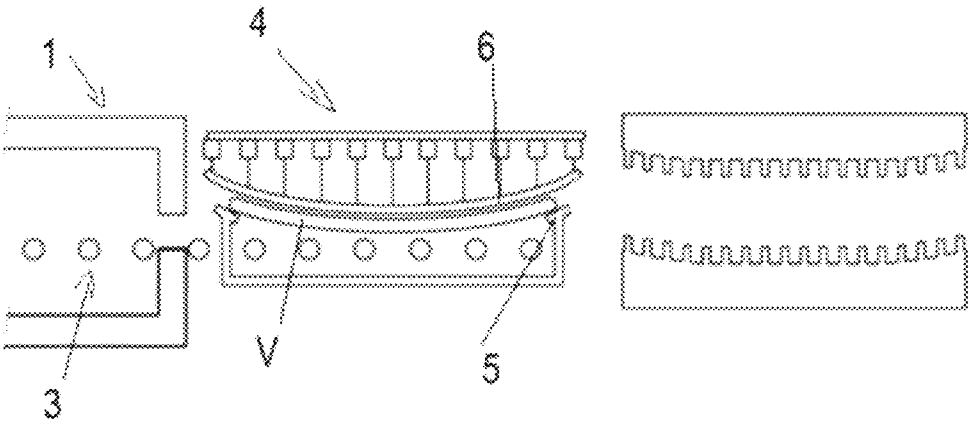
[Fig. 3]
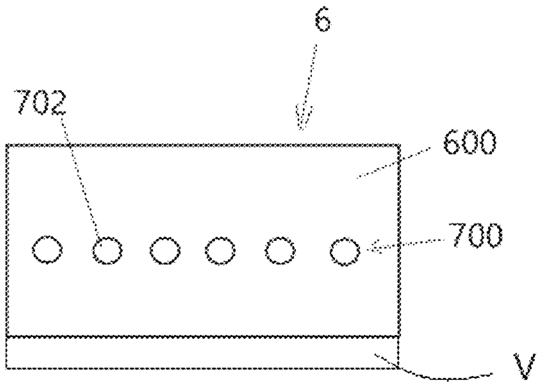

[Fig. 4]
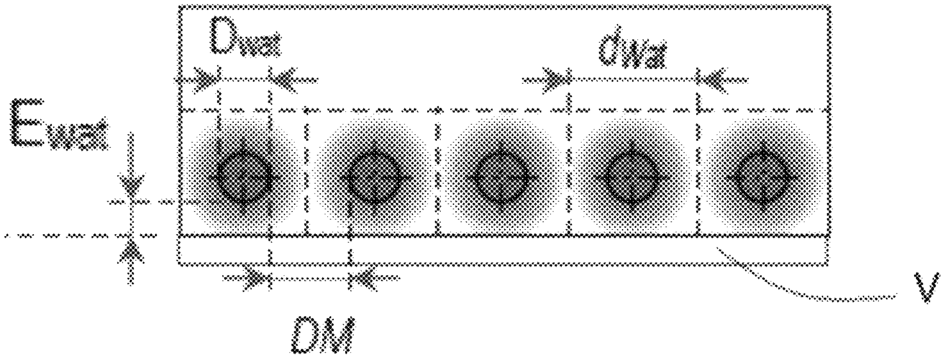
[Fig. 5]
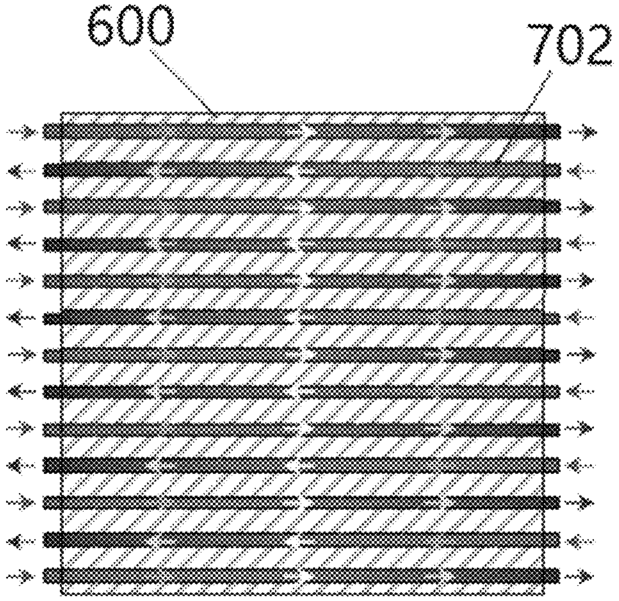
[Fig. 6]
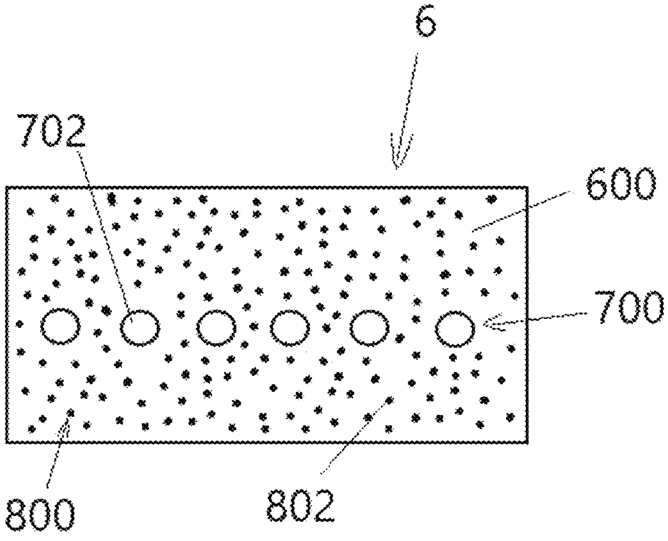

[Fig. 7]
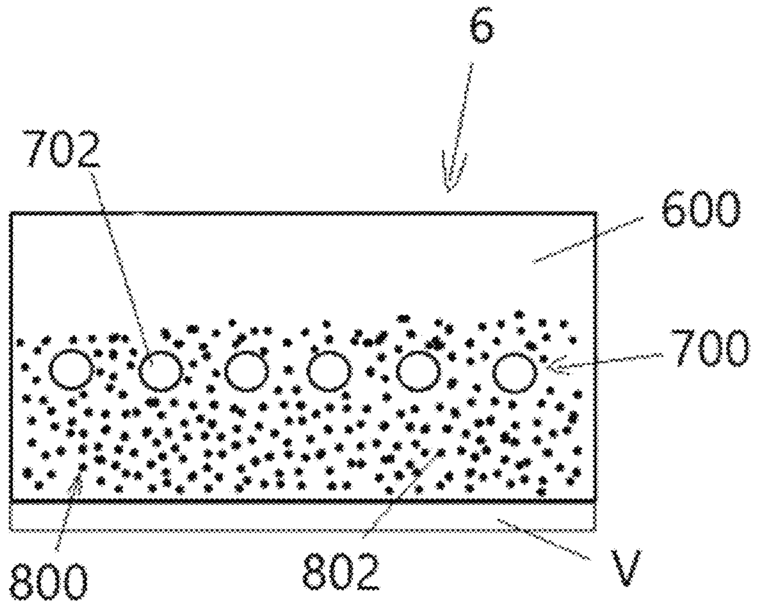
[Fig. 8]
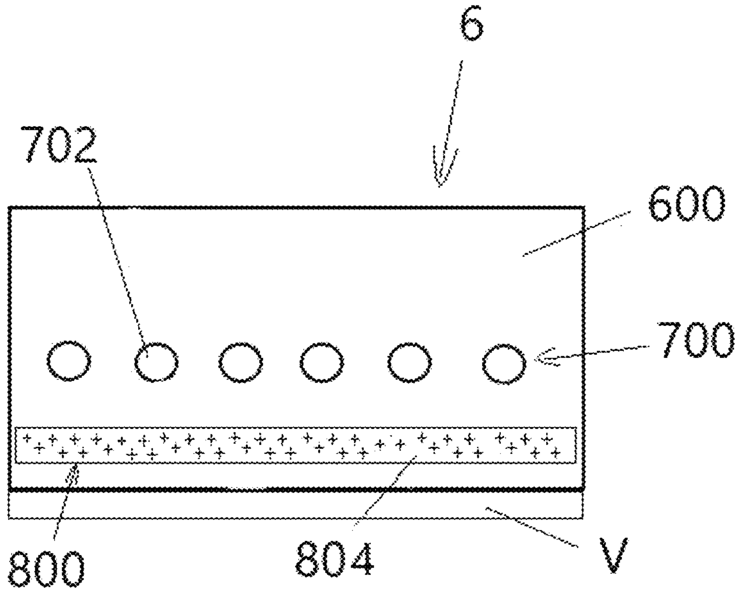

[Fig. 9]
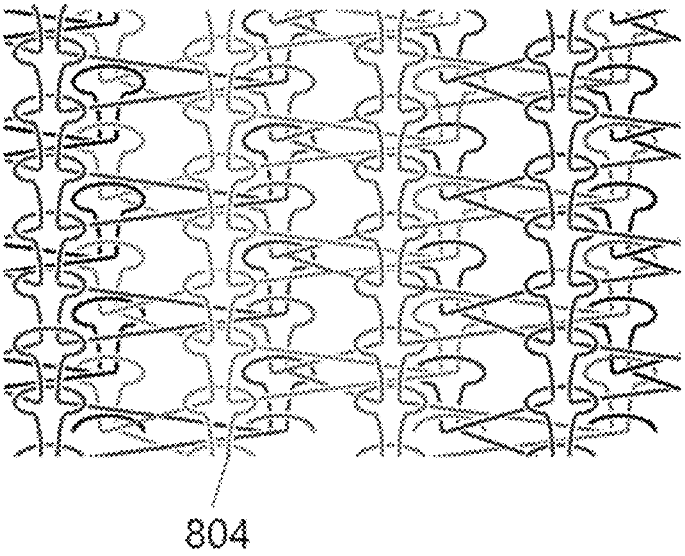
[Fig. 9']
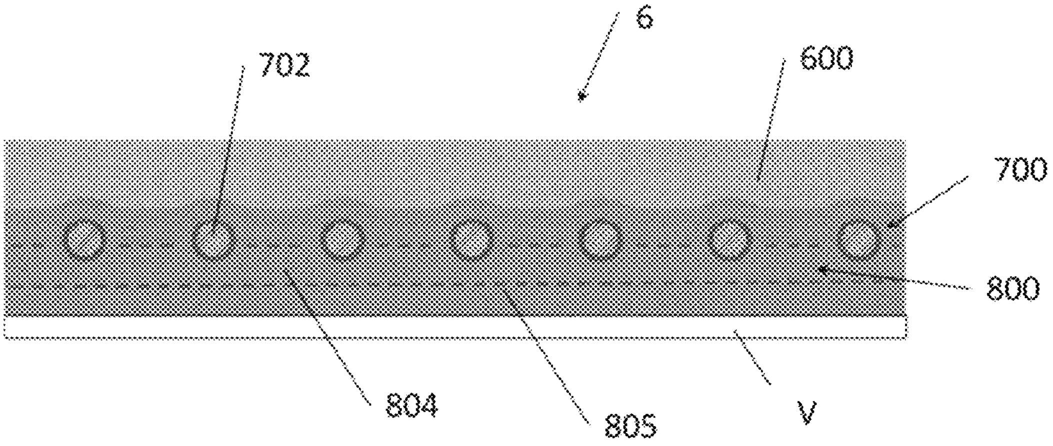
[Fig. 10a]
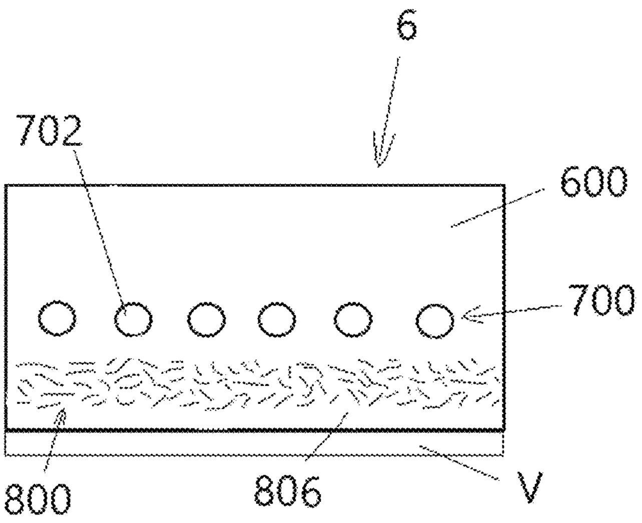

[Fig. 10b]
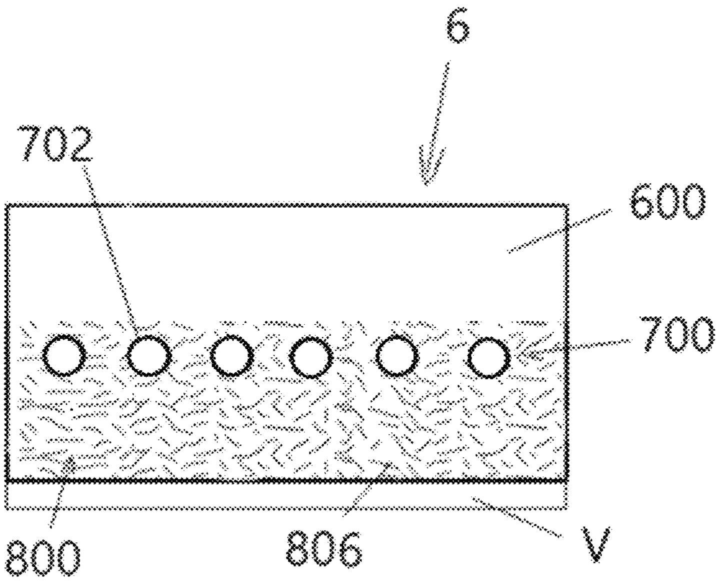

TOOL FOR SHAPING A HOT SUBSTRATE

CROSS-REFERENCE TO RELATED APPLICATIONS

This application is the U.S. National Stage of PCT/FR2022/051125, filed Jun. 13, 2022, which in turn claims priority to French patent application number 2106247 filed Jun. 14, 2021. The content of these applications are incorporated herein by reference in their entireties.

The invention relates to a technique for bending a glass sheet, followed by a step of cooling. The technique according to the invention is either suited to bending a glass sheet which is intended particularly to be tempered, or to bending glass sheets which are subsequently cooled then assembled in pairs to form a laminated glazing.

PRIOR ART

Several techniques are used to give a shape to a hot substrate such as a glass sheet. Among these techniques, one consists of having glass sheets which are conveyed one by one through a heating furnace to raise the temperature thereof to a temperature close to the softening temperature, with the glass sheets being conveyed on a roller bed. The glass sheets are subsequently transported, as soon as they leave the furnace, to a bending station. In the bending station, the glass sheet is raised off the conveyor by a frame having the shape which it is desired to give to the glass sheet. This frame is commonly referred to as a “pressing frame” or “pressing ring”. Depending on the configuration of the roller bed, the frame is continuous or discontinuous so as to be able to pass through the roller bed on which the glass sheet initially lies. The frame subsequently raises the glass sheet and presses it against a solid upper mold, commonly called a bending mold, the shape of which matches the shape of the frame and therefore corresponds to the desired shape for the glass sheet. After pressing, the glass is suctioned and held against the mold, then it is released either onto the roller bed or onto another frame referred to as transfer frame, for transfer to the cooling zone. In the former case, the rollers then begin to move again, to transport the glass sheet to the tempering station.

The two tools, the pressing frame and the bending mold, are usually covered with a layer of interlayer material in order to avoid the formation of thermal shock on the glass sheet when that sheet comes into contact with the tools. These materials are often textiles, fabrics or knitted fabrics based on refractory fibers such as silica, metal or high temperature resistant polymers such as Kevlar® fibers for example.

Aside from the particular feature of the lower frame which passes through the roller bed which serves as conveyor, this type of technique is characterized by the fact that the bending operation takes place outside the furnace, or at the very least outside a chamber kept at a high temperature. “High temperature” is intended to mean temperatures typically of greater than 250-300° C. This type of technique should thus be considered to be a cold technology, with this qualifier defining the location of the bending station outside a chamber kept at a high temperature: this means that controlling the position of the bending tools is simpler than in the case of hot technologies, and that in return, the bending method is a race against time because the glass sheet will be cooling as soon as it leaves the furnace. Modifications to the bending operation or its conditions are therefore delicate and limited.

One disadvantage of this method is that the upper mold and the frame are specific parts. This means that, for each glass shape, the upper mold and the frame have to be machined to the precise dimensions of the glass shape to be produced.

In order to allow the upper mold to be usable for different glass shapes, it is provided that this upper mold is deformable. One solution is to use an upper mold in the form of a membrane made of a polymer material. Such a material has the advantage of being flexible and therefore can be deformed to the desired curvature.

Nevertheless, a polymer membrane used as an upper mold for a bending station is not obvious because the high temperature in the bending station tends to damage said membrane.

SUMMARY OF THE INVENTION

One purpose of the present invention is to solve the problems of the prior art by providing an upper mold for a bending station which is adaptable, that is capable of allowing the production of glass sheets having different curvatures while withstanding the temperature constraints inherent in bending.

As such, the invention relates to a shaping tool comprising a membrane made of a polymer material, said membrane having a shaping surface, characterized in that said tool comprises thermalization means inserted into said membrane.

According to one example, said tool further comprises means for increasing the thermal conductivity of the membrane.

According to one example, the thermalization means comprise at least one conduit crossing the membrane according to its profile and wherein a heat transfer liquid flows.

According to one example, the thermalization means comprise a series of conduits passing through the membrane according to its profile and through which a liquid flows, these conduits extending parallel to each other.

According to one example, the heat transfer fluid in two adjacent conduits flows in opposite directions.

According to one example, said tool comprises another series of conduits extending in a direction orthogonal to the direction wherein a first series of conduits extend.

According to one example, the means for increasing the thermal conductivity of the membrane comprises metallic or carbon-based particles embedded in the polymer material.

According to one example, the means for increasing the thermal conductivity of the membrane comprises metal or carbon-based fibers.

According to one example, the means for increasing the thermal conductivity of the membrane comprises a textile.

According to an example, the textile is composed of metal fibers or spun yarns or is a knitted fabric.

According to an example, the heat transfer liquid is cooling or heating.

The invention further relates to a glass sheet bending device comprising a pressing frame arranged to fit the glass sheet and press it against an upper mold, the upper mold being a shaping tool according to the invention.

The invention further relates to a method for constructing a membrane of a shaping tool, comprising the following steps:

- Providing a mold with the shape of the membrane to be made and the polymer material that constitutes the membrane;

- Pouring said material into the mold;
- Cross-linking the material;
- Characterized in that said method comprises a step of providing thermalization means and at least one step of providing means for increasing thermal conductivity.

According to one example, the method comprises several steps of pouring said material into the mold and several steps of cross-linking the material, each step of pouring the material into the mold being followed by a step of cross-linking said material.

According to one example, the step of placing the thermalization means consists of providing the thermalization means and placing them in the mold before the membrane material is poured.

According to one example, the step of placing the thermalization means consists of providing the thermalization means and of providing an intermediate mold whose surface is similar to that of the membrane to be made but with a lesser thickness, placing the thermalization means in said intermediate mold, and pouring a part of the membrane material into the intermediate mold, the material being then cross-linked to form an intermediate slice,

- this intermediate slice being placed in the membrane mold during the step of pouring said membrane material.

According to one example, the step of placing the thermal conductivity increasing means consists of providing the thermal conductivity increasing means in the form of metallic or carbon particles or fibers and mixing them with the membrane material before the material is poured.

According to one example, the step of placing the thermal conductivity increasing means consists of providing the thermal conductivity increasing means in the form of metallic or carbon particles or fibers and mixing them with the membrane material after pouring said membrane material.

According to one example, the step of placing the thermal conductivity increasing means consists of providing the thermal conductivity increasing means in the form of a textile and placing it in the mold while the membrane material is being poured.

According to one example, the step of placing the thermal conductivity increasing means in the form of a textile consists of providing the textile and in providing an intermediate mold whose surface is similar to that of the membrane to be constructed but with a lesser thickness, placing said textile therein, and pouring a portion of the membrane material into said intermediate mold, the material being then cross-linked to form an intermediate slice,

- this intermediate slice being placed in the membrane mold during the step of pouring said membrane material.

According to one example, means for increasing thermal conductivity are magnetic and wherein at least one step of placing means for increasing thermal conductivity uses magnets to position them.

According to one example, the method is such that it comprises, before the steps of setting up thermalization means and setting up means for increasing thermal conductivity, at least one step consisting of pouring a portion of the membrane material and a step consisting of cross-linking this material.

The invention further relates to a method of thermalizing a tool according to the invention, said method consisting of continuously measuring the temperature of said tool by temperature measuring means and comparing the measured temperature with a defined working temperature, if the measured temperature is lower than the defined working temperature then the thermalization means heats said tool, and if the measured temperature is higher than the defined working temperature, then the thermalization means cools said tool.

DESCRIPTION OF THE FIGURES

Other particular features and advantages will become clear from the following description thereof, given by way of indication and entirely nonlimitingly, with reference to the appended drawings, in which:

FIG. 1 represents an upper mold for the bending station according to the invention;

FIG. 2 represents a bending station according to the invention;

FIG. 3 represents a membrane for a bending station according to the invention;

FIGS. 4 and 5 represent the membrane thermalization means according to the invention;

FIGS. 6, 7, 8, 9, 9', 10*a* and 10*b* represent different means for increasing the thermal conductivity of the membrane according to the invention.

DETAILED DESCRIPTION

In FIG. 1, a shaping tool according to the invention is represented. Such a shaping tool comprises a membrane 600 made of a polymer material and associated with translation members 70 in the form of mechanical cylinders 71. One end of each translation member 70 is connected to the membrane 600 and the other end to a rigid base 40.

This shaping tool is represented upside-down with respect to its situation in use as shown in FIG. 2 and following.

This shaping tool according to the invention is used for the shaping of a hot substrate or for the shaping of a substrate capable of becoming hot during said shaping. An example of a hot substrate is a glass sheet coming out of a furnace to be shaped.

FIG. 2 represents a furnace 1 wherein a glass sheet V passes over a roller conveyor V. While in the furnace, the glass sheet is brought to its softening temperature. The glass sheet is subsequently transported, still supported by the conveyor 3, to a shaping device 4.

This shaping device 4 is the location at which the softened glass sheet is manipulated to assume virtually its definitive shape.

In the shaping device 4, a pressing frame 5 is arranged under the plane defined by the roller conveyor 3. When the glass sheet V arrives above this frame, members, not shown in the figures, make it possible to ensure precise positioning of said glass sheet, then its movement is stopped by stopping the rollers in the bending zone. The pressing frame 5 then passes through the roller bed 3 to raise the glass sheet.

As mentioned previously, the pressing frame 5 has the shape which it is desired to give the glass sheet V, and fits to the glass sheet. The pressing frame is designed to be able to pass through the roller bed 3.

With the pressing frame 5 having taken charge of the glass sheet V, it moves to press the latter against a bending mold 6 positioned above the frame 5. The glass sheet V is therefore shaped by pressing the glass sheet between the bending mold and the pressing frame 5. The curved form 6 is associated with translation members 70 in the form of mechanical cylinders 71 as seen in FIG. 1.

The bending mold 6 is a surface, preferably solid, whose shape is adaptable, that is able to allow the construction of glass sheets with different curvatures. This bending mold is optionally covered with a knitted interlayer material made of refractory fibers such as silica, metallic fibers or high-temperature resistant polymer such as Kevlar® fibers. This interlayer material has not been shown in FIGS. 2 and 3 and those which follow. The upper mold 6 is a shaping tool according to the invention.

A further application relates to the shaping of a metal sheet in the forming device 4. This metal sheet is heated to a temperature at which it softens and is then shaped by the pressing frame and the bending mold.

In another application, the shaping tool is used as part of a method during which the substrate to be formed undergoes a temperature rise. Such a method consists, for example, in the construction of a part made of composite material reinforced by fibers of any nature (metallic, carbon, glass, or ceramic) from fiber mats and a material to form the matrix of the product, for example of the resin type, applied in liquid form or from sheets. In this application, the shaping tool is placed in the same way as in FIG. 1; the shaping surface itself is then presented at the top of the device. The different types of materials are stacked in successive layers on the surface of the shaping tool. The whole stack is shaped either naturally under its own weight, or by hand in order to press the different layers of the stack against the shaping surface, or with the help of an upper counter-shape in the form of a peripheral ring when the components of the stack have a natural rigidity that does not allow them to be shaped spontaneously under their own weight or manually. If the residual air is to be removed so that no pores are formed in the final material, the entire stack can be placed in a flexible bag wherein the residual air can be pumped out. This pocket is itself held in contact with the shaping tool. Said preparation then undergoes a step during which the matrix e that impregnates the fibers is cured on the shaping tool, in order to form said composite material with the desired shape. This curing can be done chemically by applying a curing agent or by special pressure or temperature conditions. This curing can be exothermic, that is to say, it may give off heat.

A membrane 600 for a shaping tool according to the invention has length and width dimensions of at least 100*100 mm and can go up to dimensions of 2000*3000 mm or more and has a thickness between 5 and 50 mm, preferably between 10 and 45 mm and even more preferably between 15 and 40 mm. To enable the membrane 600 to withstand high temperatures, said shaping tool comprises thermalization means 700 as visible in FIG. 3. These thermalization means 700 comprise a plurality of conduits 702 wherein a heat transfer fluid flows. These conduits 702 extend along at least one of the directions (length, width) of the membrane in its profile. Preferably, these conduits extend parallel to each other and parallel to the lower major face of the membrane 700 that is in contact with the glass sheet V to be formed.

Even more preferably, the thermalization means 700 comprises a first series of conduits 702 extending along the length of the membrane and a second series of conduits 702 extending along the width of the membrane.

The conduits 702 are made of a flexible material that allows the conduits 702 to deform without breaking when the membrane 600 is shaped. An example of a material that can be chosen is Teflon or polyethylene.

These conduits 702 are arranged to allow the best possible heat exchange.

For this, different rules or criteria are used to define the arrangement, the configuration of the conduits, these criteria are: the diameter of the conduits $D_{wat}$, the spacing of the conduits DM and the distance $E_{wat}$ between the conduits and the lower face of the membrane, that is to say, the face in contact with the hot glass as visible in FIG. 4.

The criterion of the distance between the conduits and the bottom surface of the membrane is important because if the conduits 702 are too close to the bottom surface (in contact with the glass) then residual deformations of the bottom surface of the membrane appear when the membrane is stressed mechanically. These deformations are in the form of regular lines that create slight hollow grooves on the surface of the membrane and can be transferred to the glass sheet during the forming process.

The criteria for the distance DM between two adjacent conduits and the diameter of the conduits are such that the distance between two adjacent conduits must be approximately twice the value of $E_{wat}$. The idea is that each duct drains heat into a virtual tube with a square base within the membrane whose side has a length $d_{Wat}$ approximately equal to $2 \times E_{wat}+D_{wat}$, where $D_{wat}$ is the diameter of the conduits containing the heat transfer fluid.

These criteria allow us to obtain the following values for the geometric parameterization of the conduits:

- the distance $E_{wat}$ is comprised between 2 and 10 mm, more preferably between 2 and 7 mm and even more preferably between 3 and 6 mm;
- the distance DM is comprised between 2 and 20 mm, more preferentially between 3 and 15 mm and even more preferentially between 5 and 12 mm;
- the diameter of the conduits containing the heat transfer fluid $D_{wat}$ is between 1 and 7 mm, preferentially between 2 and 6 mm and even more preferentially between 3 and 5 mm.

Other parameters related to the thermalization means are:

- the flow rate of the heat transfer fluid inside the circuit is relatively modest, typically between 1 and 10 L/min, but can be higher depending on the diameter of the conduits and the required thermalization capacity;
- the temperature of the heat transfer fluid depends on the difference between the measured temperature of the membrane and its defined working temperature. The temperature of the heat transfer fluid is between −10 and 250° C., preferentially between 0 and 200° C. and even more preferentially between 10 and 200° C.

When forming a hot substrate, the membrane 600 requires cooling. To this end, conduits 702 are used to transport a coolant to cool said membrane 600.

In one embodiment, the flow of the heat transfer fluid in the conduits 702 is performed in such a way that the flow is in both directions as seen in FIG. 5. It is understood that the heat transfer fluid flows in opposite directions in two adjacent conduits 702. Indeed, if the circulation is always in the same direction, a temperature gradient appears since the cold heat transfer fluid enters the conduits on a first side and leaves the conduits on a second side. This heat transfer fluid is heated up by absorbing the calories from the membrane so that a temperature gradient appears between the first and second side. This tends to make the performance of the membrane less homogeneous.

With a two-way flow and the fact that this flow in two adjacent conduits is in opposite direction, a mutual influence takes place between the conduits having different flows, making it possible to limit the surface thermal gradients at the membrane.

In the event that the membrane is to be cooled, the thermalization circuit 700 is used to dissipate heat from the membrane, the present invention is such that it cleverly allows the heat to be directed to the thermalization means 700. This is because the maximum amount of heat is at the surface of the membrane in contact with the hot substrate, while the conduits are arranged in the membrane. Advantageously, the invention allows heat to be directed from the surface to the thermalization means so that this heat can be dissipated.

For this purpose, means for increasing the conductivity 800 are arranged in the membrane 600.

A first solution is to increase the thermal conductivity of the membrane by making the polymer material more thermally conductive.

For this purpose, this first solution consists of incorporating, into the material forming the membrane, particles 802 made of a material having an intrinsic thermal conductivity higher than that of the material forming the membrane as visible in FIG. 6. The material used for the particles is preferably a metallic material such as aluminum, bronze, copper, soft iron or carbon-based material such as graphite or carbon black.

These particles 802 are thus mixed with the polymer before it is molded and then cross-linked.

To change the conductivity, the proposed particle 802 is variable so that the higher the particle rate, the greater the thermal conductivity. The particle content can be up to 60% by volume.

For example, it is thus easy to go up from thermal conductivity values of about 0.2 W·m−1·K−1 for the raw elastomer matrix to a thermal conductivity value of 0.48 W·m−1·K−1 with a loading ratio of aluminum particles of 40 vol %.

In one embodiment, the distribution of the particles 802 is made heterogeneous to make only one area of the membrane more thermally conductive.

More particularly, it is conceivable to make the area between the lower surface that is in contact with the hot substrate of the membrane 600 and the thermalization means 700 more thermally conductive as visible in FIG. 7.

For this purpose, the selected metal particles 802 have magnetic properties, that is they are capable of being attracted by a magnet. This possibility makes it possible, during the molding of the membrane-forming material 600 wherein the particles 802 are mixed, to apply a magnetic force via magnets in order to attract the magnetic metal particles 802 to a defined area and thus control this distribution.

In an alternative embodiment, two layers of material are successively deposited, the first layer loaded with heat-conducting particle 802 improving thermal conduction and constituting the lower part of the membrane 600 from its lower surface to the level of the conduits, the upper part being made with a layer of material not loaded with heat-conducting particles.

A second solution for directing heat from the surface to the thermalization means 700 is to incorporate an insert 804 into the membrane 600 as seen in FIG. 8. This insert 804 is an insert made of a metallic material to increase the thermal conductivity of the membrane.

This 804 insert is a textile that can be presented in different forms.

In a first embodiment, the textile insert 804 comprises metal fibers or carbon fibers or a mixture of both. These fibers are good conductors of heat because of the material they are made of. In addition, good conduction is also achieved by a high form factor, as these fibers are in the form of filaments. Indeed, the higher the form factor of the introduced particles, the better the improvement of the thermal conductivity of the membrane. The form factor quantifies how far a particle deviates from a sphere. One can thus define an elongation index equal to the ratio length on width for elongated particles, like grains of rice for example, or a flattening index, like the diameter-to-thickness ratio in the case of a coin for example. In practice, the use of filaments such as metal or carbon fibers cut and dispersed in the elastomer matrix is very effective in increasing its thermal conductivity.

In a second form, the textile is in the form of a knitted fabric as seen in FIG. 9. This knitted fabric is composed of a stack of stitches. Each stitch is actually a loop of yarn of a certain length. Compared to a fabric, the yarn in a knitted stitch is relatively distended, which gives the knitted fabric as a whole great flexibility as well as the ability to shape itself to a wide range of geometries. More precisely, each loop has both the ability to distort very widely when the knitted fabric is deformed macroscopically and to return to its initial geometry when the macroscopic deformation stops.

In addition, since the yarn forming each stitch has a good form factor, the use of a knitted fabric allows for good thermal conductivity while having the flexibility to deform with the membrane.

In a third embodiment, the textile is in the form of a spun yarn itself made from finely divided metal fibers with a diameter of between 8 and 20 μm and more particularly between 8 and 16 μm. A "spun" yarn has the characteristic of being formed from staple fibers. These are held together by twisting, and form an elementary component called a "strand". Several "strands" are then twisted together to form the spun yarn. Spun yarn has the property of being "hairy" which means that there are a large number of elementary fiber ends that protrude from the surface of the knit itself. This property is beneficial because when you have several layers of knitted fabrics, these fiber ends that protrude from the surface of the metal knits interpenetrate at the interface of two adjacent layers. This allows for thermal bridges to be established between the different knitted layers, thus improving the ability to conduct heat. In an alternative, the textile comprising metal fibers or spun or knitted yarn is impregnated. The textile is impregnated with an elastomeric material similar, preferably identical, to the one constituting the membrane. This impregnation improves the contact between the metal fibers and the membrane material. In fact, without impregnation, there is a possibility that the contact between the metal fibers and the membrane material is incomplete due to the presence of gaps between said fibers and the membrane material. These air-filled gaps then tend to degrade thermal conductivity performance.

By being impregnated, the textile limits the possibility of having open spaces between said fibers and said membrane material, and thus limits the degradation of the thermal performances.

This textile is preferably arranged between the lower surface of the upper mold and the thermalization means 700. This arrangement allows the heat to be conducted from the surface to the thermalization means 700 which removes it. This alternative is shown FIG. 9' where conductivity increasing means 800 are arranged in the lower part of the membrane 600. These conductivity increasing means 800 are composed of a stack of three inserts 804, in this case, three layers of impregnated metal knit filling the space between the lower surface of the membrane that comes into contact with the hot glass sheet V and the thermalization means 700 composed of a series of parallel conduits 702 wherein a heat transfer fluid flows. To be more explicit, the interface between each layer of impregnated knitted fabric is represented by a dotted line 805. A layer of impregnated knitted fabric is even arranged over the array of thermalization means 700 to further improve the thermal conductivity of the membrane around each conduit 702. The different layers of knitted fabric are advantageously impregnated with elastomer, which is itself partially or totally charged with fine metallic particles, which further improves the thermal conductivity of the whole.

In a third alternative, increasing the thermal conductivity of the membrane involves incorporating metallic or carbon fibers 806 into the membrane-forming material as visible in FIGS. 10*a* and 10*b*. These metallic fibers 806 are in the form of lamellae or strips with a good form factor, that is allowing good conduction. These metallic fibers have a length of about 0.5 to 10 mm for a width of about 0.05 to 0.5 mm.

The conductivity increasing means 800 may include several means such as a textile-like insert 804 and particles 802 or particles and fibers.

To make a membrane according to the invention, the basic method is to provide the membrane material and a mold having the shape of the membrane and then pour/cast said material into the mold. Once the material is poured, the whole is left to rest so that the elastomer can cross-link.

To incorporate the thermalization means 700, the mold is adapted to allow said means to be placed therein in the required position before the membrane material is poured into said mold.

In an alternative, the thermalization means 700 are previously integrated into a layer of the membrane material. This alternative consists of providing a secondary mold wherein the thermalization means 700 are placed and then casting the membrane material. The secondary mold has the same surface as the main mold but with less thickness. Once the material is cast, it is left to rest so that it can cross-link. A "slice" of the membrane material is then obtained wherein the thermalization means 700 are placed.

It is then possible to pour the remaining membrane material into the membrane mold while inserting the "slice" of membrane material wherein the thermalization means 700 are placed. The whole is then left to rest so that the remaining material can cross-link and thus obtain the membrane.

In a configuration wherein metallic particles 802 or metallic fibers 806 are embedded in the membrane 600, the method is modified to incorporate a step of embedding such particles or fibers.

First, these metal particles or fibers are integrated into the elastomeric membrane material before it is poured into the mold. In this case, the elastomeric material is stored in a container. The particles or fibers are then poured into the container and the whole is mixed to have a homogeneous concentration.

Second, these metal particles or fibers are integrated into the elastomeric membrane material after it is poured into the mold. In this case, two options are possible: before the installation of the thermalization means 700, in which case it is possible to mix these particles or fibers in the elastomer material in order to have a homogeneous distribution. Alternatively, the particles 802 or fibers 806 are integrated after the thermalization means 700 are installed and they extend through the thickness by gravity.

In both possibilities, it is possible, if the particles or fibers are magnetic, to arrange magnetic means such as magnets around the mold to control the distribution of these particles or fibers.

In another embodiment wherein a textile is arranged, the method is modified to include a step of incorporating the textile. This textile is integrated when the elastomer material is poured into the mold, before the thermalization means 700 are put in place.

According to a first solution, once the elastomeric material is poured, the textile is placed in the mold. Gravity will send it to the bottom of the mold, said bottom being the lower face or face in contact with the glass.

In a second solution, the integration of the textile requires the construction of the membrane in several iterations. For this, a first iteration consists of pouring, in the mold, a quantity of elastomer such that it represents a thickness equal to 10% of the total thickness of the membrane. This amount of elastomeric material is then left to rest so that it can cross-link.

Then, in a second iteration, the remaining elastomeric material is poured in. The textile is then incorporated. This textile moves by gravity to come in contact with the already-cross-linked elastomer. This second solution prevents the textile from getting too close to the surface in order to keep that textile from causing surface defects to appear.

In an alternative to this second solution, a number of iterations greater than two is possible. It is thus possible to have, in addition to the first iteration, one iteration per metal knit, one iteration for the thermalization means 700 and a final iteration.

In this second solution, the conductivity increasing means 800 in the form of particles can be mixed with the membrane material before or after it is poured.

Of course, if the textile is magnetic, magnets can be placed around the mold to control the positioning of said textile.

In a hot substrate forming method, the membrane 600 has a thermal profile such that its temperature increases with time. Thermalization means 700 using a cooling liquid are then used to keep said membrane at an operating temperature, which is dependent on the membrane material. The temperature profile thus presents a transient profile wherein the temperature is changing, and a stable profile during which the membrane 600 is cooled and therefore the temperature is regulated.

However, it has been noted that when the membrane 600 is in its transient profile, the shape of the substrates formed is variable because the change in temperature of the membrane 600 results in a varying membrane response.

To avoid this, the conduits 702 of the thermalization means 700 are used to shorten the transient and preheating profile of said tool prior to the hot substrates passing through. For this purpose, the conduits are used to circulate a heating liquid. This heating liquid is injected to increase the temperature of the membrane to reach the optimal operating temperature more quickly.

In this case, the conduits 702 are connected to a cooling circuit and a heating circuit. The changeover from one to the other is done by means of valves controlled by a control unit. This control unit is also connected to means for measuring the temperature of the membrane. These measuring means comprise at least one sensor which can be a thermocouple or a thermal camera or an infrared sensor. Thus, the measuring means allow the control unit to switch from injecting a heating liquid into the thermalization means to a cooling liquid or vice versa.

Of course, the present invention is not limited to the illustrated example but is susceptible to various variants and modifications which will become apparent to the person skilled in the art.

The invention claimed is:

1. A shaping tool comprising a flexible membrane made of a polymer material, said flexible membrane being deformable to a desired curvature for glass shaping and having a shaping surface, and a thermalization means comprising at least one deformable conduit traversing said flexible membrane according to a profile of the flexible membrane.

2. The shaping tool according to claim 1, further comprising means for increasing the thermal conductivity of the flexible membrane.

3. The shaping tool according to claim 2, wherein the means for increasing the thermal conductivity of the flexible membrane comprise metallic or carbon-based particles embedded in the polymer material.

4. The shaping tool according to claim 2, wherein the means for increasing the thermal conductivity of the flexible membrane comprise metallic or carbon-based fibers.

5. The shaping tool according to claim 2, wherein the means for increasing the thermal conductivity of the flexible membrane comprise a textile.

6. The shaping tool according to claim 5, wherein the textile is composed of metal fibers or spun yarns or is a knit.

7. The shaping tool according to claim 1, wherein a heat transfer fluid flows through said at least one deformable conduit.

8. The shaping tool according to claim 7, wherein the thermalization means comprise a series of deformable conduits traversing the flexible membrane according to said profile and wherein the heat transfer liquid flows, the conduits extending parallel to each other.

9. The shaping tool according to claim 8, wherein the heat transfer fluid in two adjacent conduits flows in opposite directions.

10. The shaping tool according to claim 7, wherein the at least one deformable conduit comprises a plurality of deformable conduits, said plurality of deformable conduits comprising first and second series of conduits, and wherein the second series of conduits extending in a direction orthogonal to a direction wherein the first series of conduits extend.

11. The shaping tool according to claim 7, wherein the heat transfer fluid is a cooling fluid or a heating fluid.

12. A glass sheet bending device comprising, a pressing frame arranged to fit a glass sheet and press a glass sheet against an upper mold, the upper mold being the shaping tool according to claim 1.

13. A method for constructing a flexible membrane of a shaping tool comprising:

providing a mold with a shape of the flexible membrane to be made and a polymer material that constitutes the flexible membrane;

pouring said material into the mold;

cross-linking the material;

providing thermalization means and providing means for increasing thermal conductivity of the flexible membrane, wherein said flexible membrane is deformable to a desired curvature for glass shaping and has a shaping surface, and the thermalization means comprising at least one deformable conduit traversing said flexible membrane according to a profile of the flexible membrane.

14. The method according to claim 13, wherein the method comprises a plurality of steps of pouring said material into the mold and a plurality of steps of cross-linking the material, each step of pouring the material into the mold being followed by a step of cross-linking said material.

15. The method according to claim 13, wherein the providing of the thermalization means comprises providing the thermalization means and placing the thermalization means in the mold before the flexible membrane material is poured.

16. The method according to claim 14, wherein the providing of the thermalization means comprises providing the thermalization means and providing an intermediate mold, placing the thermalization means in said intermediate mold, and pouring a part of the flexible membrane material into the intermediate mold, the material being then cross-linked to form an intermediate slice, said intermediate slice being placed in the flexible membrane mold during the pouring of said flexible membrane material.

17. The method according to claim 13, wherein the providing of the thermal conductivity increasing means comprises providing the thermal conductivity increasing means in the form of metallic or carbon particles or fibers and mixing them with the flexible membrane material before the material is poured.

18. The method according to claim 13, wherein the providing of the thermal conductivity increasing means comprises providing the thermal conductivity increasing means in the form of metallic or carbon particles or fibers and mixing them with the flexible membrane material after pouring said flexible membrane material.

19. The method according to claim 13, wherein the providing of the thermal conductivity increasing means comprises providing the thermal conductivity increasing means in the form of a textile and placing it in the mold while the flexible membrane material is being poured.

20. The method according to claim 19, wherein the providing of the thermal conductivity increasing means in the form of a textile comprises providing the textile and providing an intermediate mold, placing said textile in the intermediate mold, and pouring a portion of the flexible membrane material into said intermediate mold, the material being then cross-linked to form an intermediate slice, said intermediate slice being placed in the membrane mold during the pouring of said membrane material.

21. The method according to claim 13, wherein the means for increasing thermal conductivity are magnetic.

22. The method according to claim 13, further comprising, before providing the thermalization means and providing the means for increasing thermal conductivity, pouring a portion of the flexible membrane material and cross-linking the membrane material.

23. A method of thermalizing a shaping tool according to claim 1, comprising continuously measuring a temperature of said shaping tool by temperature measuring means and comparing the measured temperature with a defined working temperature, wherein if the measured temperature is lower than the defined working temperature then the thermalization means heat said tool, and if the measured temperature is higher than the defined working temperature, then the thermalization means cool said tool.

* * * * *